(12) United States Patent
Bai

(10) Patent No.: US 9,696,149 B1
(45) Date of Patent: Jul. 4, 2017

(54) AUTOMATIC SEAM DETECTION MACHINE

(71) Applicants: Zhaoqing Canneed Instrument Limited, Zhaoqing (CN); Dongguan Canneed Automation Equipment Technology Limited, Dongguan (CN)

(72) Inventor: Zhongwen Bai, Zhaoqing (CN)

(73) Assignees: ZHAOQING CANNEED INSTRUMENT LIMITED, Zhaoqing (CN); DONGGUAN CANNEED AUTOMATION EQUIPMENT TECHNOLOGY LIMITED, Dongguan (CN)

( * ) Notice: Subject to any disclaimer, the term of this patent is extended or adjusted under 35 U.S.C. 154(b) by 0 days.

(21) Appl. No.: 15/134,257

(22) Filed: Apr. 20, 2016

(30) Foreign Application Priority Data

Feb. 16, 2016 (CN) .......................... 2016 1 0087135

(51) Int. Cl.
*G01B 11/30* (2006.01)
*B23D 45/10* (2006.01)
*B21D 51/26* (2006.01)

(52) U.S. Cl.
CPC ............ *G01B 11/30* (2013.01); *B21D 51/26* (2013.01); *B23D 45/10* (2013.01)

(58) Field of Classification Search
CPC .. G01B 11/30; B21D 51/2684; B21D 51/386; B21D 51/2661; B21D 51/2676; B21D 51/26; B21D 43/28; B21D 43/285; B21D 43/287; B21D 43/282; B21D 45/10; B23D 45/10
See application file for complete search history.

(56) References Cited

U.S. PATENT DOCUMENTS

| | | | | |
|---|---|---|---|---|
| 1,981,945 A | * | 11/1934 | Burns .................. | B21D 51/386 413/1 |
| 2,881,475 A | * | 4/1959 | Wilckens ............... | B21D 51/46 264/268 |
| 3,561,386 A | * | 2/1971 | Meister .................. | B65B 51/16 413/28 |
| 3,908,572 A | * | 9/1975 | Johnson ................. | B21D 51/46 413/27 |

(Continued)

FOREIGN PATENT DOCUMENTS

JP          04041032 A  *  2/1992

*Primary Examiner* — Edward Moran
*Assistant Examiner* — Pradeep C Battula
(74) *Attorney, Agent, or Firm* — Ming Chow; Sinorica, LLC

(57) ABSTRACT

An automatic seam detection machine is disclosed herein, including a conveying device and a seam detection device. The conveying device includes a feeding station, provided with a feed valve. When a sample can is conveyed to the feeding station, the feed valve opens and the sample can arrives at the detecting station of the seam detection device through the feed valve. Since more sample cans can be placed in the conveying device, operators can place batches of sample cans in the conveying device in one time; and the sample cans can be automatically conveyed to the feeding station by the conveying device, then conveyed to the seam detection device for detection automatically by opening the feed valve. Compared with prior arts, this invention can achieve automatic feeding, so as to facilitate the batch detection, with high degree of automation.

8 Claims, 11 Drawing Sheets

(56) References Cited

U.S. PATENT DOCUMENTS

| | | | | |
|---|---|---|---|---|
| 4,152,997 A | * | 5/1979 | Webster | B21D 51/2653 |
| | | | | 413/29 |
| 4,316,375 A | * | 2/1982 | Lee, Jr. | B21D 51/26 |
| | | | | 72/105 |
| 5,180,095 A | * | 1/1993 | Orth | B21C 37/122 |
| | | | | 228/13 |
| 7,757,527 B2 | * | 7/2010 | Kubacki | B21D 51/26 |
| | | | | 72/370.22 |
| 8,858,411 B2 | * | 10/2014 | Mossi | B21D 43/28 |
| | | | | 198/468.4 |

\* cited by examiner

AUTOMATIC SEAM DETECTION MACHINE

The current application claims a foreign priority to application number 201610087135.5 filed on Feb. 16, 2016 in China

TECHNICAL FIELD

This invention relates to the technical field of sample can seam measurement, and in particular, to an automatic seam detection machine.

BACKGROUND

The sealing of metal cans refers to the flange of can body and the round seam of can lid in the can seamer, to roll the can body and the can lid and form a closely overlapping seam. The roll seam is called double-seam. The sealing of double-seam is completed mainly by four parts: chuck, first roller of tray and two roller devices.

The sealing quality of cans and easy opening cans has a decisive significance for the product quality. If the sealing is not qualified, it will not only cause damage to the appearance of cans and easy opening cans, but also the air and bacteria may enter the cans, to deteriorate the products, causing can leaking and shortening the shelf life. The double-seam sealing technology can firmly connect the can body and can lid, forming an airtight sealing state and smooth seam, which can enhance the organoleptic quality of cans and extend the shelf life of the products.

To this end, it is necessary to cut and measure the seams of cans and easy opening cans apart from the production. The traditional cutting and measurement method is as follows: an employee cuts the seam of sample cans with a cutting tool, then manually places the sample can to a detection device to scan for capturing the images, then analyzes the images to know if the seam of sample can is qualified. Since it is cut manually, the detection of a large batch of sample cans usually requires repetitive work, and it is slow and labor-intensive, moreover, the manual-cutting of cans will bring a high risk of injuries.

For the above shortcomings, an automatic seam cutting measuring machine is proposed. This measuring machine can achieve automatic cutting and measurement of the sample cans when placed in the detecting station. Although this equipment can achieve automatic detection, it can detect only one sample can each time; thus, during the batch detection process, operators shall place cans in the site, reducing the degree of automation of the equipment.

SUMMARY

The object of the invention is to provide an automatic seam detection machine with high degree of automation that can automatically feed to facilitate the detection in batches.

In order to achieve the object, the invention adopts the following technical solutions:

An automatic seam detection machine, comprising a seam detection device and a conveying device that can accommodate at least two sample cans, wherein the conveying device includes a feeding station, provided with a feed valve corresponding to the detecting station of the seam detection device, when a sample can is conveyed to the feeding station, the feed valve opens and the sample can arrives at the detecting station of the seam detection device through the feed valve.

Wherein, it further comprises a partition board, and the conveying device is provided at one side of the partition board and the seam detection device is provided at the other side of the partition board, the feed valve includes a feed port arranged at the partition board and a bolt plate arranged at the feed port, when the feed valve is in a closed state, the bolt plate blocks the feed port.

Wherein, the conveying device comprises a conveying turntable, with at least two feeding holes, when the feeding holes rotate to the conveying station, the feeding holes are aligned with the feed port.

Wherein, the feeding station is provided with a feeding device, and when the feed valve is opened, the feeding device can convey the sample cans on the feeding station to the detecting station, or convey the sample cans on the detecting station to the feeding station.

Wherein, the feeding device comprises a feeding cylinder and a gripping device, the gripping device grips the sample can and the feeding cylinder drives the gripping device to come close to/leave away the feed port.

Wherein, the gripping device comprises a sucker, a can-pressing cylinder and a top lever that connects the can-pressing cylinder, and the can-pressing cylinder can drive the top lever to push the sample can away from the sucker.

Wherein, the seam detection device comprises a clamping device, a cutting device, a feed mechanism and a camera, the clamping device reaches the seam detection device to fix the sample can, the feed mechanism drives the cutting device to move to the sample can, the cutting device cuts the sample can to form a notch at the rim, and the camera captures the image of the notch.

Wherein, the clamping device comprises a clamping turntable and a rotating motor, the sample can is fixed at the clamping turntable and the clamping turntable is driven by the rotating motor to rotate to drive sample can to rotate.

Wherein, the cutting device comprises a cutting motor, a cutting blade and a push block, the cutting motor drives the cutting blade to cut the sample can, and the push block pushes against the cutting place of the sample can to form an opening.

Wherein, the cutting blade comprises a first blade and a second blade arranged in parallel, and the pressing block is arranged between the first blade and the second blade.

The invention can achieve the following beneficial effects:

The automatic seam detection machine disclosed in the invention comprises a conveying device and a seam detection device. The conveying device includes a feeding station, provided with a feed valve. When a sample can is conveyed to the feeding station, the feed valve opens and the sample can arrives at the detecting station of the seam detection device through the feed valve. Since more sample cans can be placed in the conveying device, operators can place batches of sample cans in the conveying device one time; and the sample cans can be automatically conveyed to the feeding station by the conveying device, then conveyed to the seam detection device for detection automatically by opening the feed valve. Compared with prior arts, this invention can achieve automatic feeding, so as to facilitate the batch detection, with high degree of automation.

DETAILED DESCRIPTION OF THE EMBODIMENTS

Figure 1:
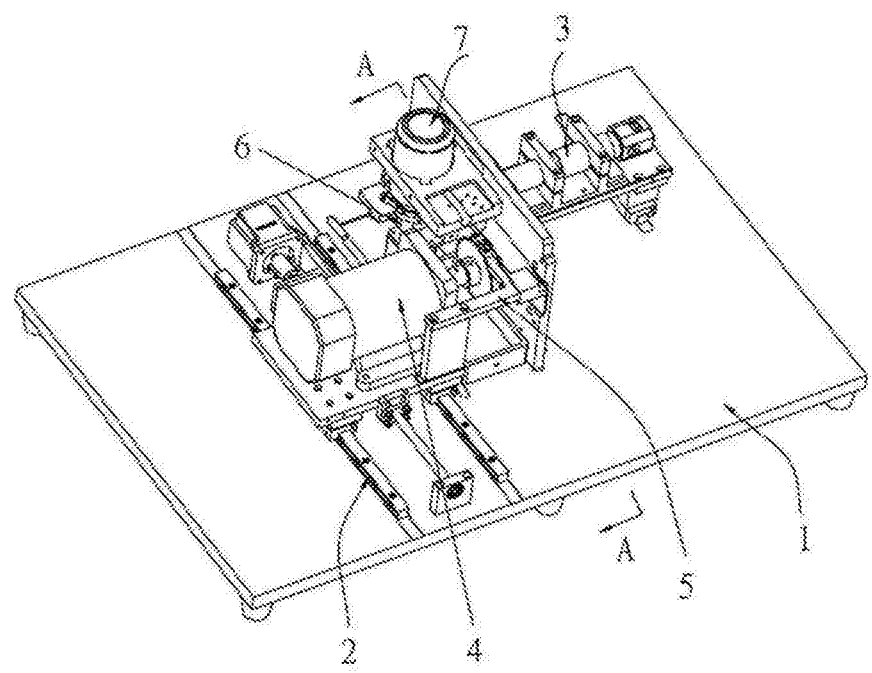
FIG. 1 shows the three-dimensional structure of seam detection device in the invention.

The present invention provides a specific embodiment of an automatic seam detection machine, comprising a conveying device, a seam detection device and a partition board 91 used for separating the conveying device and the seam detection device. Specifically, the conveying device is arranged above the partition board 91 and the seam detection device is arranged below the partition board 91. A feed port 931 is provided on the partition board 91. The upper part of the feed port 931 corresponds to the conveying station of the conveying device, and lower part of the feed port 931 corresponds to the detecting station of the seam detection device. A bolt plate 932 is provided at the feed port 931, and the bolt plate 932 and the feed port 931 constitute a feed valve. The bolt plate 932 can block the feed port 931 driven by the bolt cylinder 932, thus the feed valve is at the closed state to prevent the sample cans from entering the seam detection device. The bolt cylinder 933 can also drive bolt plate 932 to depart from the feed port 931, so that the feed valve is in the open state and the sample cans can pass through the feed port 931 smoothly to arrive at the detecting station of the seam detection device.

Figure 9:
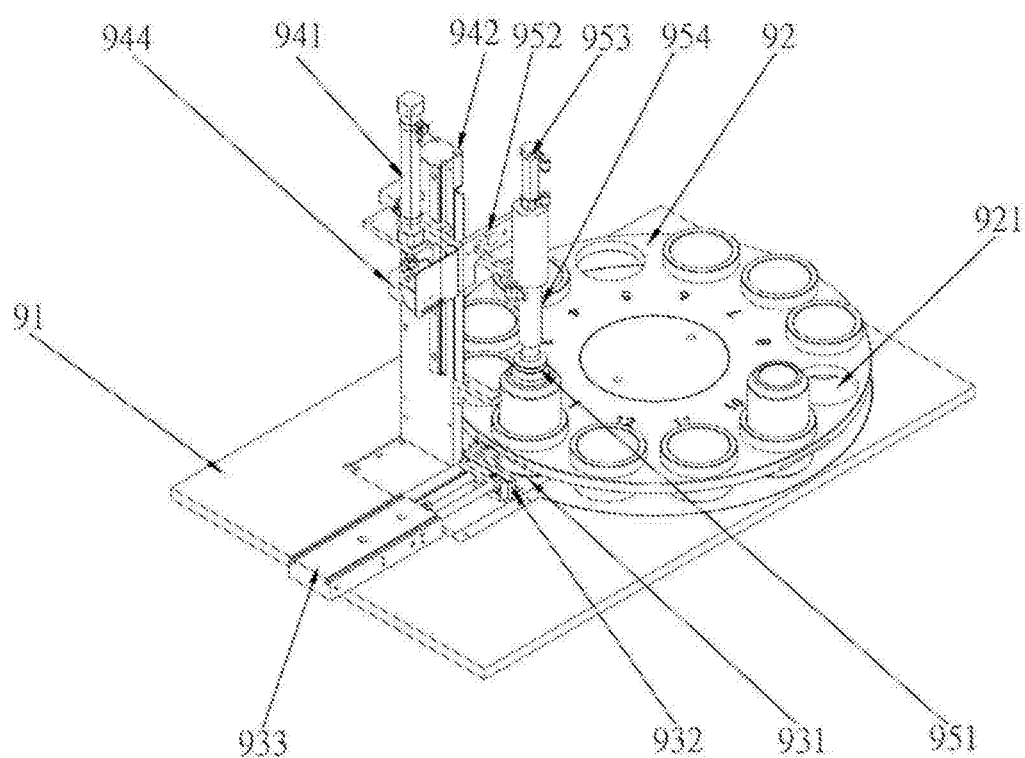
FIG. 9 shows the three-dimensional structure of a conveying device in the invention.

Referring to FIG. 9, the conveying device in this embodiment comprises a conveying turntable 92 and a feeding device arranged at the conveying station. There are a number of feeding holes 921 on the conveying turntable 92; when detecting, the sample cans are placed in the feeding hole 921. By rotating, the conveying turntable 92 can convey the sample cans at the feeding hole 921 to the conveying station. When sample cans are conveyed to the conveying station, the system can control to open the feed valve, and the feeding device will push the sample can to the detecting station of the seam detection device.

Figure 10:
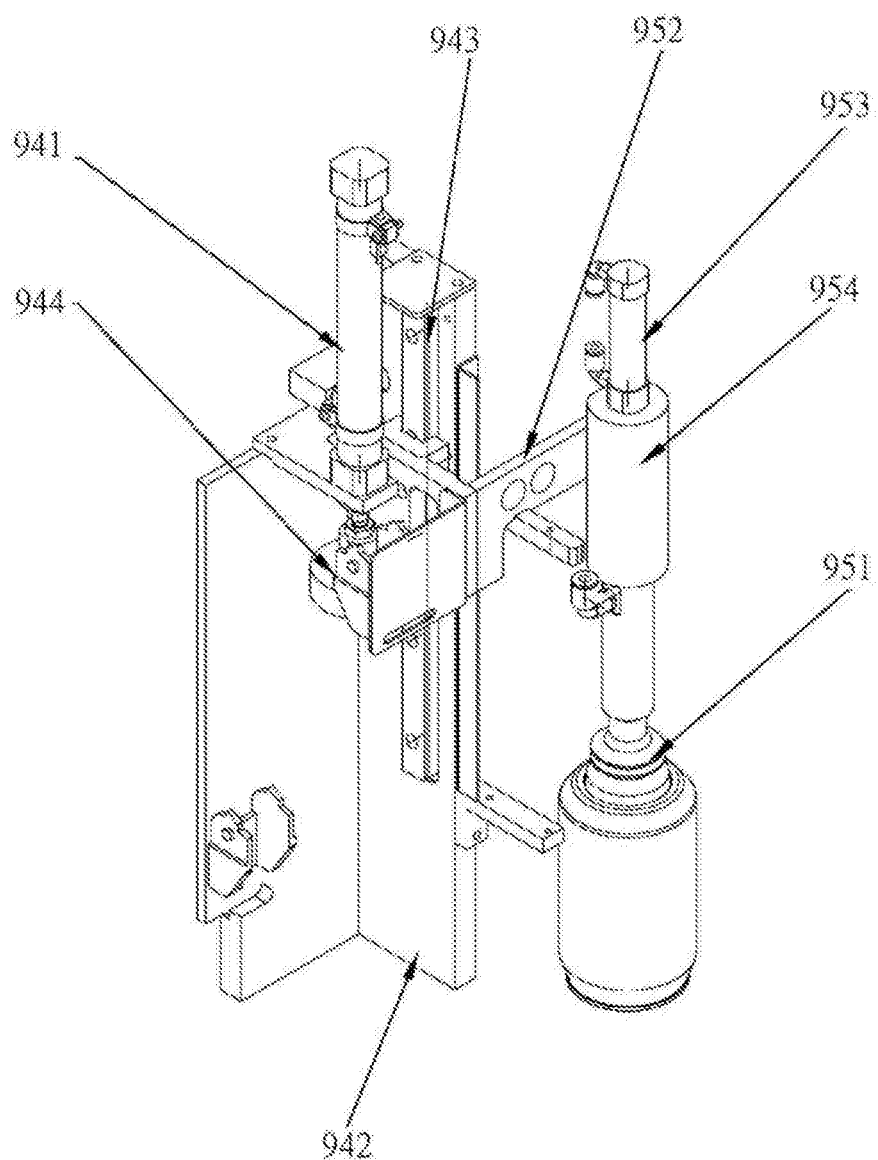
FIG. 10 shows the three-dimensional structure of a feeding device in the invention.

Referring to FIG. 10, the feeding device comprises a feeding cylinder 941 and a vertical slab 942. The vertical slab 942 is provided with a feeding guide rail 943, above which is mounted a gripping mounting base 952 that can move along the feeding guide rail 943 back and forth. A gripping device that can grip sample cans is fixed on the gripping mounting base 952, and a push disc 944 is arranged at the end of the feeding cylinder 941. The push disc 944 is connected to the gripping mounting base 952 and the feeding cylinder 941 drives the push disc 944, to drive the gripping mounting base 952 to move up and down.

Figure 11:
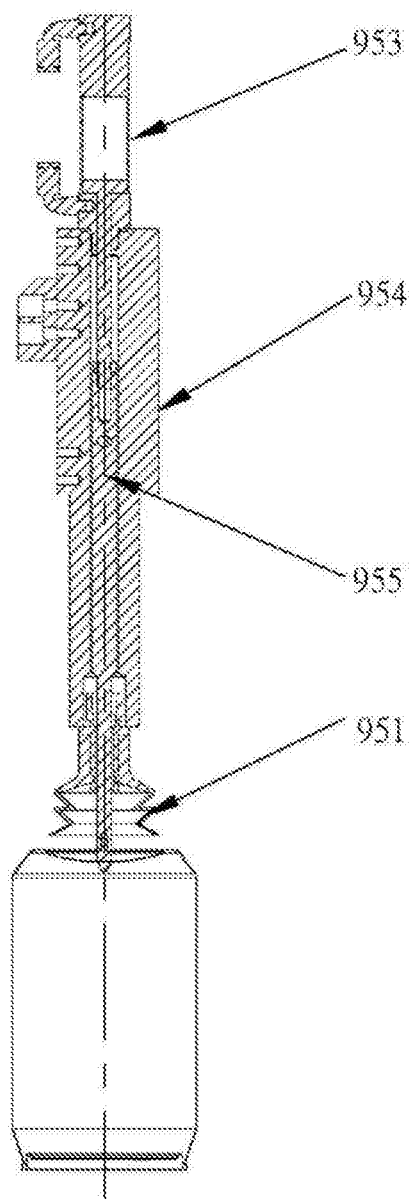
FIG. 11 shows the cross-sectional view of a gripping device in the invention.

Specifically, referring to FIG. 11, the gripping device comprises a sucker 951 and a sucker mounting base 954. The sucker 951 is mounted below the sucker mounting base 954, and a can-pressing cylinder 953 is arranged above the sucker mounting base 954. A top lever 955 driven by the can-pressing cylinder 953 is provided in the inner chamber of the sucker mounting base 954. When a sample can is conveyed to the conveying station, the can-pressing cylinder 953 drives the top lever 955 to contract upwards, the feeding cylinder 941 drives the gripping device to move downwards until the sucker 951 sucks the sample can tightly, then the feed valve is opened, the gripping device is driven by the feeding cylinder 941 to move downwards, to drive the sample can to move downwards until the detecting station of the seam detection device, and the seam detection device clamps the sample can to complete detection. The gripping device driven by the feeding cylinder 941 moves upwards, to bring the sample can back to the above of the partition board 91. The feed valve is closed, and the can-pressing cylinder 953 drives the top lever 955 to the sample can, to detach the sample can from the sucker 951, then the conveying turntable 92 is rotated to move the sample can that is detected away from the feeding station and convey the next sample can to the feeding station. With this feeding device, the sample can be smoothly conveyed to the detecting station, and after detection, the sample can will be taken out from the detecting device by the feeding device, to facilitate the next detection.

Referring to FIG. 1-FIG. 8, the seam detection device in this embodiment comprises a base plate 1, a linear feed mechanism 2, a projector 3, a cutting device 4, a pressure port linkage frame 5 and a sample can clamping device 6 arranged at the detecting station. The sample can clamping device 6 is arranged on the base plate 1, the linear feed mechanism 2 is arranged on one side of the sample can clamping device 6, and the cutting device 4 is arranged on the linear feed mechanism 2, which moves towards the sample can clamping device 6 driven by the linear feed mechanism 2, to cut the sample can 7 on the sample can clamping device 6. The pressure port linkage frame 5, arranged on the cutting device 4, can press the sample can 7 on the cutting opening after the sample can 7 is cut by the cutting device 4. The projector 3, corresponding to the other side of the sample can clamping device 6, is arranged on the base plate 1.

Figure 2:
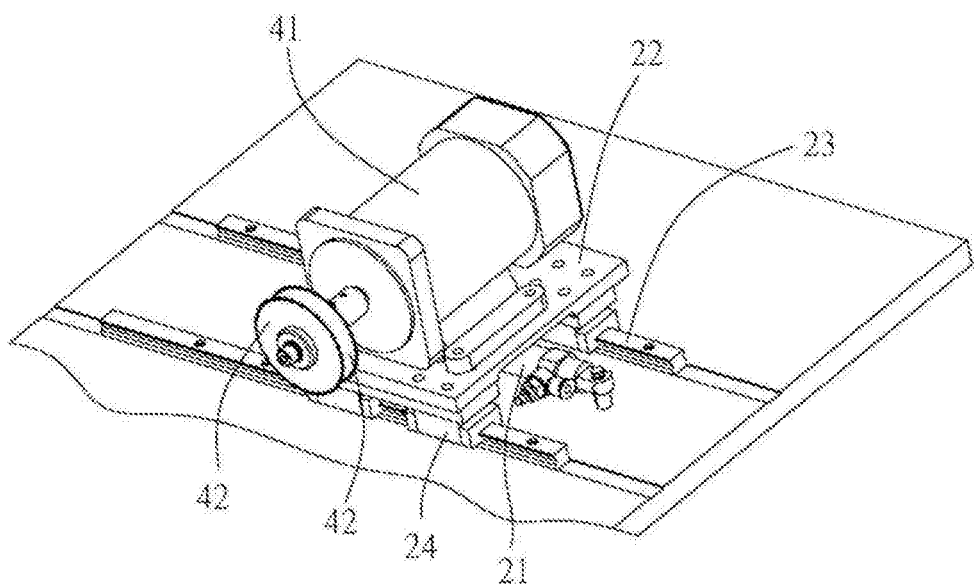
FIG. 2 shows the schematic diagram of seam detection device of a linear feed mechanism in the invention (I).
Figure 3:
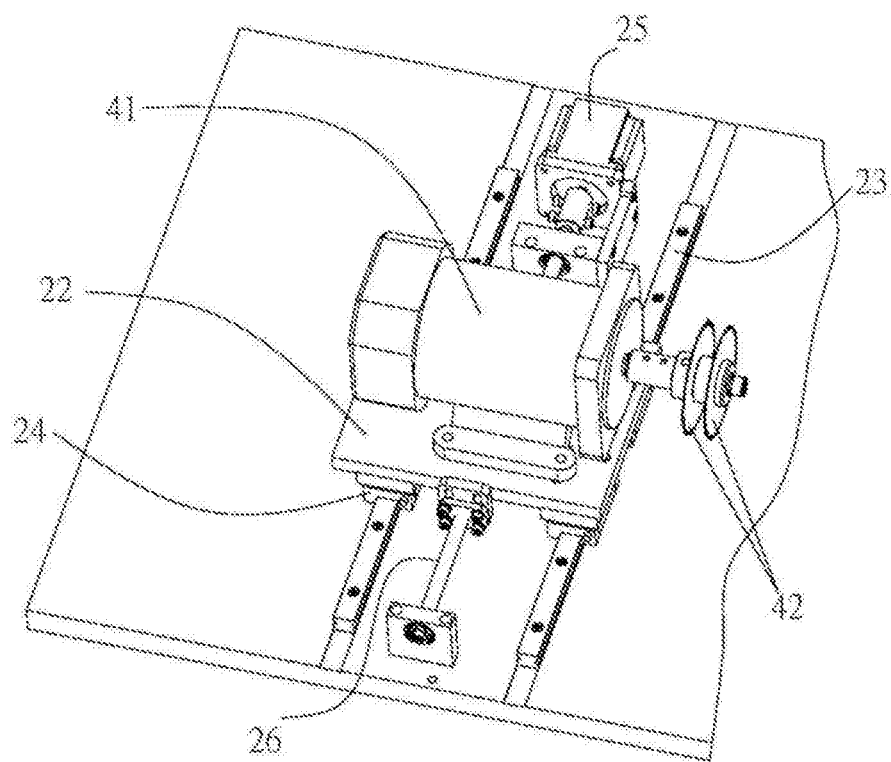
FIG. 3 shows the schematic diagram of seam detection device of a linear feed mechanism in the invention (II).

Specifically, referring to FIG. 2, the linear feed mechanism 2 comprises a feeding cylinder 21, a sliding seat 22, a linear guide rail 23 and a sliding block 24 that is adapted to the linear guide rail 23. The sliding seat 22 is arranged on the linear guide rail 23 movably via the sliding block 24, the body of the feeding cylinder 21 is fixed on the base plate 1, and the piston rod of the feeding cylinder 21 is connected with the sliding seat 22 via the connecting base. In other embodiments, the linear feed mechanism 2 can adopts other structure, for example, the linear feed mechanism 2 comprises a stepping motor 25, a feed screw 26, a sliding seat 22, a linear guide rail 23 and a sliding block 24 adapted to the linear guide rail 23; the sliding seat 22 is arranged on the linear guide rail 23 movably via the sliding block 24 and the bottom of the sliding seat 22 is provided with nuts adapted to the feed screw 26. The feed screw 26 passes through the nut and it is arranged on the base plate 1 through the bearing block. The stepping motor 25 is arranged on the base plate 1 and the rotating shaft of the stepping motor 25 is connected with the feed screw 26 through a coupling.

Figure 4:
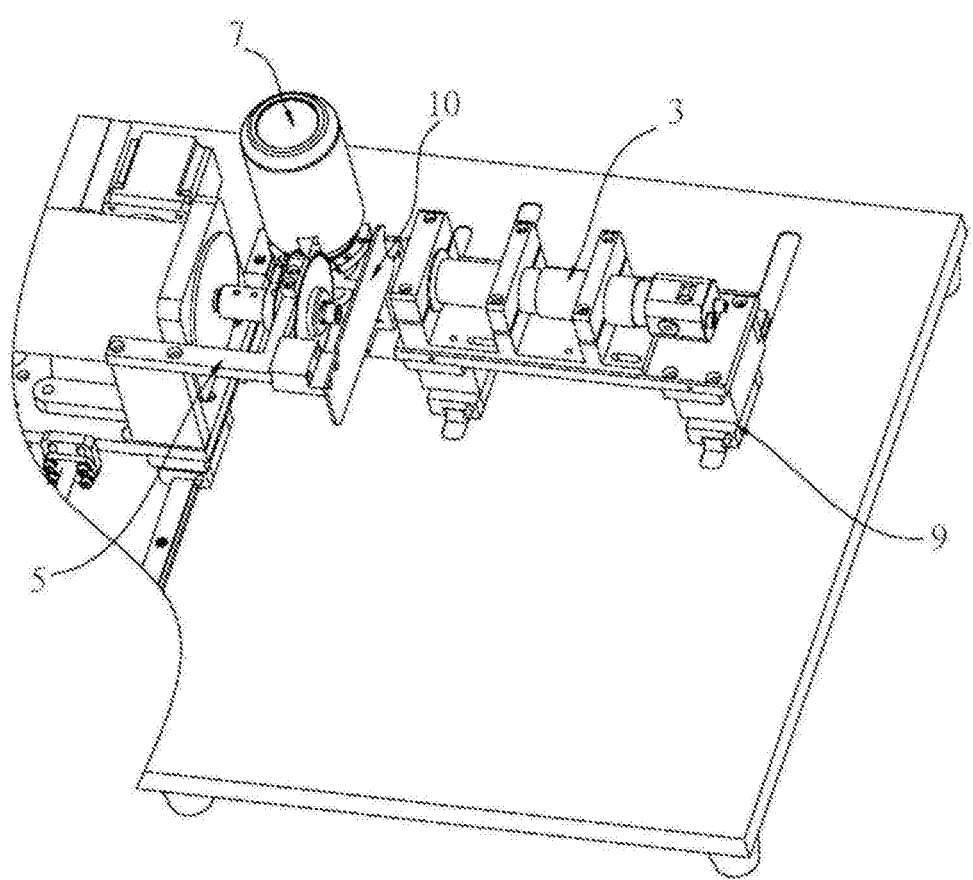
FIG. 4 shows the schematic diagram of seam detection device of a projector in the invention.
Figure 5:
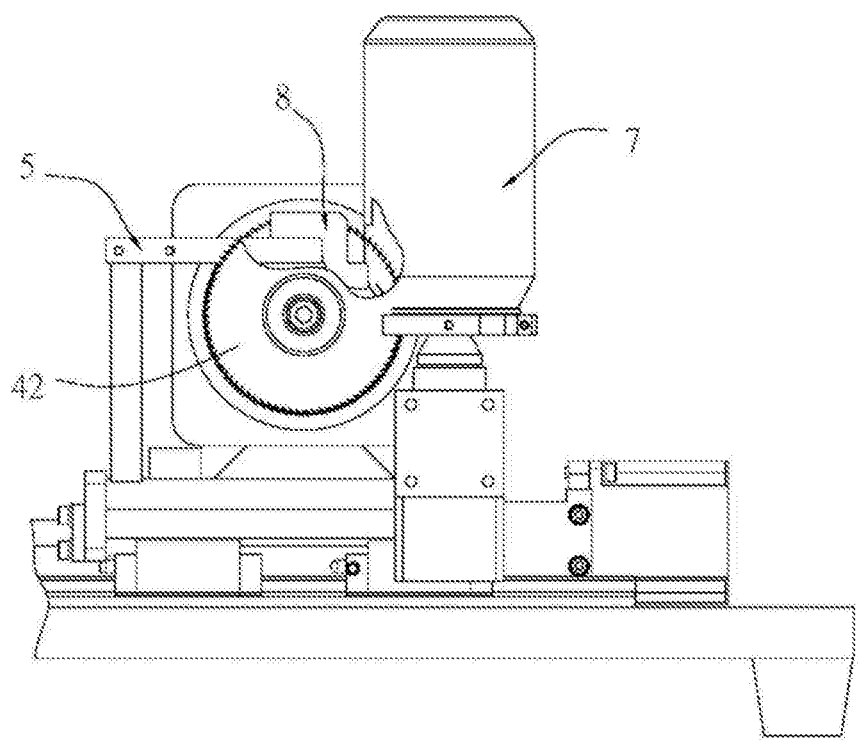
FIG. 5 shows the schematic diagram of seam detection device of a pressure port linkage frame in the invention.
Figure 6:
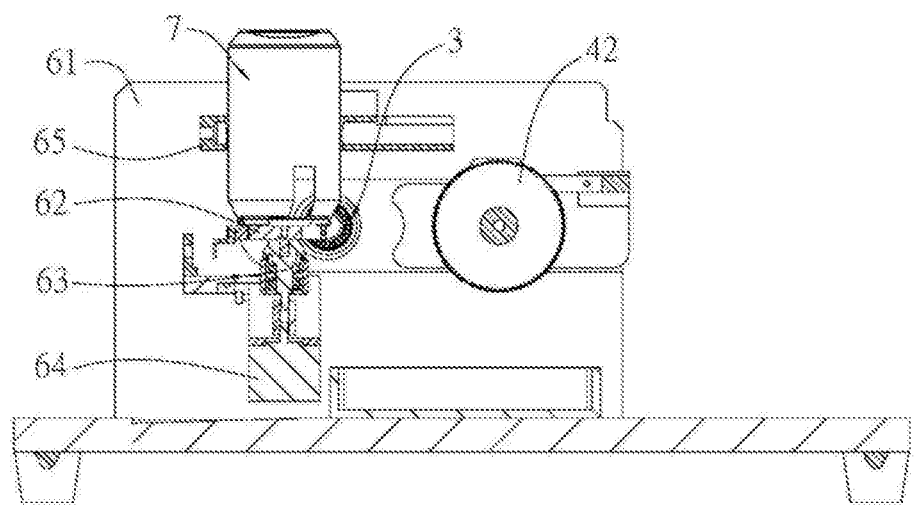
FIG. 6 shows the A-A section view in FIG. 1.

Referring to FIG. 4, FIG. 5 and FIG. 6, the cutting device 4 comprises a cutting motor 41 and two saw blades 42. The two saw blades 42 are provided on the rotating shaft of the cutting motor 41, and the cutting motor 41 is provided on the sliding seat 22.

Referring to FIG. 4 and FIG. 5, one end of the pressure port linkage frame 5 is fixed on the sliding seat 22, and the other end of which is extended between two saw blades 42 and provided with a push block 8.

Figure 7:
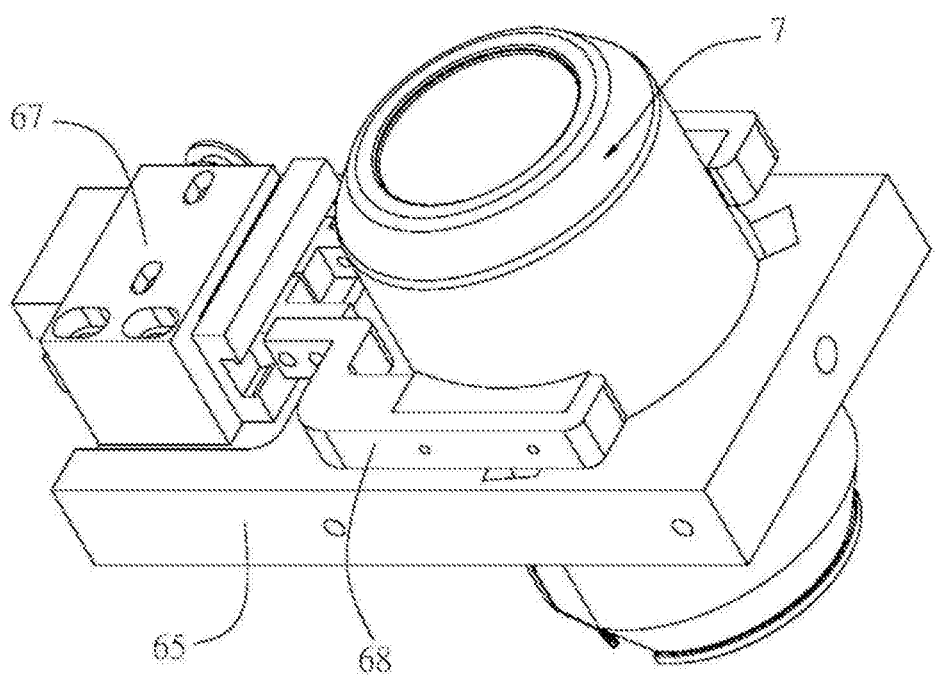
FIG. 7 shows the schematic diagram of a clamping arm in FIG. 6.
Figure 8:
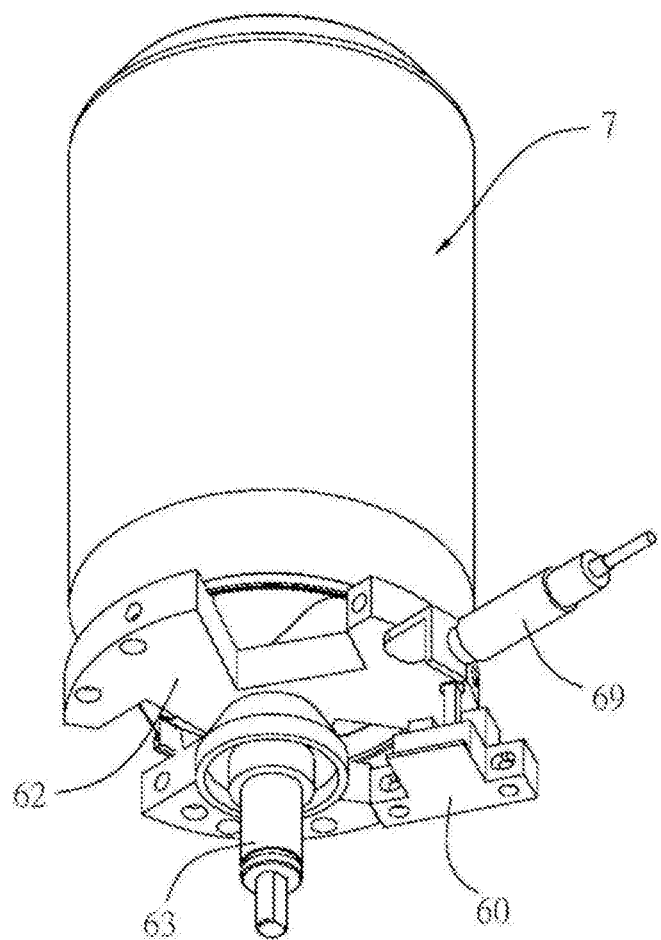
FIG. 8 shows the schematic diagram of a three-jaw clamp in FIG. 6.

Referring to FIG. 6, FIG. 7 and FIG. 8, the clamping device 6 comprises a vertical plate 61, a three-jaw clamp 62, a clamping shaft 63, a rotating motor 64, a base plate 65, a clamping cylinder 67 and two clamping arms 68. The vertical plate 61 is vertically arranged on the base plate 1, the seat board 65 is arranged horizontally above the vertical plate 61. A sample can port is provided on the seat board 65 and the side of clamping cylinder 67 corresponding to the sample can port is arranged on the seat board 65, and two clamping arms 68 are symmetrically arranged on the clamping cylinder 67; the rotating motor 64 corresponding to the sample can port is arranged on the base plate 1 and the rotating shaft of the rotating motor 64 faces upwards. The three-jaw clamp 62 is connected with the rotating shaft of the rotating motor 64 through the clamping shaft 63. A proximity switch 69 and a sensor 60 are provided on the three-jaw clamp 62.

Preferably, referring to FIG. 4, a projector baffle 10 is provided on the side of the projector 3 corresponding to the sliding seat 22, to prevent the foreign matters from splashing to the projector 3 and effectively protect the projector 3, enhancing the shooting resolution. In order to enhance the flexibility, the projector 3 is arranged on the base plate 1 through the linear guide rail assembly 9 whose trajectory is consistent with the feed trajectory of the linear feed mechanism 2, to meet the demands for detecting sample cans of different sizes.

During operation, operators can place the sample cans in batch on the conveying device in one time. The conveying device can automatically convey the sample cans to the feeding station, and by opening the feed valve, sample cans can be automatically delivered to the clamping device 6, and the linear feed mechanism 2 drives the cutting device 4 to cut. It can achieve good cutting effect, free of distortion or burrs, moreover, after cutting, the pressure port linkage frame 5 can be driven to press the seam notch; the linear feed mechanism 2 drives the cutting device 4 and pressure port linkage frame 5 to return, so that the seam sections of sample can 7 can be exposed outside, to facilitate the projector 3 to get the seam cross-sectional images quickly and clearly, and then conduct analysis and processing of images by the analysis system, to get the related parameters of the seam of the sample can 7, such as seam length, can body hook length, can lid hook length, iterative length, seam gap length, iterative rate, can body hook overlap percentage, can lid hook overlap percentage, seam image thickness, fitting length, to determine if the seam of the sample can 7 is acceptable. Besides, these relevant parameters and images are stored in the database for easy access, and these seam images saved can be used for re-measurement at any time.

The whole operation process is simple, convenient, easy to implement, which can replace the previous measurement method of cans cut manually. It can achieve automatic feeding, automatic can cutting and automatic acquisition of images, and the measurement results are more accurate, reliable, greatly enhancing the measurement accuracy and speed, reducing the labor intensity while enhancing the efficiency. It can be applied to sample cans of different types.

The invention has been disclosed in details as above. Those technicians skilled in the art can change and modify the above mode of execution. Thus, the present invention is not limited to the specific embodiments disclosed and described herein, and some modifications and changes to the invention shall fall into the scope of protection. In addition, although some specific terms used herein, they are merely for convenience of explanation, rather than restriction on the invention. As stated in above embodiments, other machinery with the same or similar structures shall fall into the scope of protection of the invention.

What is claimed is:

1. An automatic seam detection machine comprising:
   a seam detection device;
   a conveying device;
   the seam detection device and the conveying device being adapted to accommodate at least two sample cans;
   the seam detection device comprising a detecting station;
   the conveying device comprising a feeding station;
   the feeding station comprising a feed valve;
   the feed valve corresponding to the detecting station;
   in response to one of the at least two sample cans being conveyed to the feeding station, the feed valve being open so as to render the one of the at least two sample cans arriving at the detecting station through the feed valve;
   the feeding station comprising a feeding device;
   in response to the feed valve being open, the feeding device conveying the one of the at least two sample cans from one of the feeding station and the detecting station to the other one of the feeding station and the detecting station;
   a partition board;
   the conveying device being provided at one side of the partition board;
   the seam detection device being provided at the other side of the partition board, opposite to the conveying device;
   the feed valve comprising a feed port arranged at the partition board and a bolt plate arranged at the feed port; and
   the feed valve being closed by the bolt plate blocking the feed port.

2. The automatic seam detection machine according to claim 1 further comprising:
   the conveying device comprising a conveying turntable;
   the conveying turntable comprising at least two feeding holes; and
   in response to the at least two feeding holes being rotated to the conveying station, the at least two feeding holes being aligned with the feed port.

3. The automatic seam detection machine according to claim 1 further comprising:
   the feeding device comprising a feeding cylinder and a gripping device; and
   in response to the gripping device gripping the one of the at least two sample cans, the feeding cylinder driving the gripping device to come close to or leave away the feed port.

4. The automatic seam detection machine according to claim 3 further comprising:
   the gripping device comprising a sucker, a can-pressing cylinder and a top lever;
   the top lever being connected to the can-pressing cylinder; and
   the can-pressing cylinder being adapted to drive the top lever to push the one of the at least two sample cans away from the sucker.

5. The automatic seam detection machine according to claim 1 further comprising:
   the seam detection device comprising a clamping device, a cutting device, a feed mechanism and a camera;

the clamping device being adapted to reach the seam detection device to fix the one of the at least two sample cans;

the feed mechanism being adapted to drive the cutting device to move to the one of the at least two sample cans;

the cutting device being adapted to cut the one of the at least two sample cans to form a notch at a rim; and the camera being adapted to capture an image of the notch.

6. The automatic seam detection machine according to claim 5 further comprising:

the clamping device comprising a clamping turntable and a rotating motor; and in response to the one of the at least two sample cans being fixed at the clamping turntable, the clamping turntable being driven by the rotating motor to rotate the one of the at least two sample cans.

7. The automatic seam detection machine according to claim 5 further comprising:

the cutting device comprising a cutting motor, a cutting blade and a push block;

the cutting motor being adapted to drive the cutting blade to cut the one of the at least two sample cans; and the push block being adapted to push against a cutting place of the one of the at least two sample cans to form an opening.

8. The automatic seam detection machine according to claim 7 further comprising:

the cutting blade comprising a first blade and a second blade arranged in parallel; and a pressing block being arranged between the first blade and the second blade.

* * * * *